(12) United States Patent
Keen et al.

(10) Patent No.: US 11,526,543 B2
(45) Date of Patent: Dec. 13, 2022

(54) AGGREGATE COMMENT MANAGEMENT FROM FORWARDED MEDIA CONTENT

(71) Applicant: International Business Machines Corporation, Armonk, NY (US)

(72) Inventors: Martin G. Keen, Cary, NC (US); Shikhar Kwatra, Raleigh, NC (US); Hemant Kumar Sivaswamy, Pune (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 16/928,332

(22) Filed: Jul. 14, 2020

(65) Prior Publication Data

US 2022/0019607 A1    Jan. 20, 2022

(51) Int. Cl.
| | |
|---|---|
| *G06F 7/00* | (2006.01) |
| *G06F 16/33* | (2019.01) |
| *G06F 16/9535* | (2019.01) |
| *G06N 5/04* | (2006.01) |
| *G06N 20/00* | (2019.01) |
| *G06F 16/35* | (2019.01) |

(52) U.S. Cl.
CPC .......... *G06F 16/3344* (2019.01); *G06F 16/35* (2019.01); *G06F 16/9535* (2019.01); *G06N 5/04* (2013.01); *G06N 20/00* (2019.01)

(58) Field of Classification Search
CPC .. G06F 16/3344; G06F 16/35; G06F 16/9535; G06N 20/00; G06N 5/04
See application file for complete search history.

(56) References Cited

U.S. PATENT DOCUMENTS

| | | | |
|---|---|---|---|
| 8,166,013 B2 | 4/2012 | Bandaru | |
| 8,209,320 B2 | 6/2012 | Reitter | |
| 9,152,722 B2 | 10/2015 | Sahni | |
| 9,467,408 B1 | 10/2016 | Sherman-Presser et al. | |
| 2013/0238445 A1* | 9/2013 | Rao ................... | G06Q 30/0267 705/14.66 |
| 2013/0246168 A1* | 9/2013 | Wickramasuriya .... | G06Q 30/02 705/14.49 |

(Continued)

FOREIGN PATENT DOCUMENTS

| | | |
|---|---|---|
| CN | 103389971 B | 11/2013 |
| CN | 109618236 A | 4/2019 |

*Primary Examiner* — Mohammad A Sana
(74) *Attorney, Agent, or Firm* — Heather Johnston (57) ABSTRACT

Aspects of the present invention disclose a method for managing aggregated comments of a forwarded media based on the sentiments of the forwarded media and relevance to a user. The method includes one or more processors identifying a user based at least in part on information provided by the user. The method further includes accessing user activity data utilizing the information provided by the user. The method further includes generating a first profile corresponding to the user based at least in part on the user activity data. The method further includes determining one or more preferences of the user based at least in part on the generated first profile. The method further includes identifying segments of textual data of forwarded media the user receives based at least in part on the preferences of the user, wherein the textual data corresponds to a comment associated with the forwarded media.

20 Claims, 4 Drawing Sheets

(56) References Cited

U.S. PATENT DOCUMENTS

| | | | |
|---|---|---|---|
| 2014/0337126 A1* | 11/2014 | Ohanyan | G06Q 30/0251 |
| | | | 705/14.49 |
| 2016/0164985 A1 | 6/2016 | Song et al. | |
| 2017/0124074 A1* | 5/2017 | Cama | G06F 16/637 |
| 2019/0320037 A1 | 10/2019 | Nair | |
| 2021/0312318 A1* | 10/2021 | Ambrozic | G06N 3/0472 |

* cited by examiner

AGGREGATE COMMENT MANAGEMENT FROM FORWARDED MEDIA CONTENT

BACKGROUND OF THE INVENTION

The present invention relates generally to the field of social networking systems, and more particularly to managing comments of forwarded media content.

In recent years, there has been an increase in demand to utilize the advanced techniques for analyzing large and/or complex data sets. In particular, natural language processing (NLP), which is a sub-field of computer science that enables a computer to process and analyze large amounts of natural language data. Sentiment analysis utilizes NLP, computational linguistics, and text analysis to extract and analyze subjective information. A basic task in sentiment analysis is classifying the polarity of a given text where an expressed opinion of the given text is positive, negative, or neutral. Advanced sentiment classification techniques are able to determine an expressive tone of a given text as well.

A neural network is a computing system modeled on the human brain, which provides a framework for many different machine learning algorithms to work together and process complex data inputs. A neural network is initially trained, where training includes providing input data and telling the network what the output should be. Neural networks have been used on a variety of tasks (e.g., speech recognition, machine translation, etc.).

Social media is an interactive computer-mediated technology that facilitates the creation and sharing of information through virtual communities and networks. User-generated content, such as text posts or comments, photos, videos, and data generated through online interactions are the lifeblood of social media. Users usually access social media services via web-based technologies on desktops and laptops, or download services that offer social media functionality to their mobile devices (e.g., smartphones and tablets).

SUMMARY

Aspects of the present invention disclose a method, computer program product, and system for managing aggregated comments of a forwarded media content based on the sentiments associated with the content and relevance to a user. The method includes one or more processors identifying a user based at least in part on information provided by the user. The method further includes one or more processors accessing user activity data utilizing the information provided by the user. The method further includes one or more processors generating a first profile corresponding to the user based at least in part on the user activity data. The method further includes one or more processors determining one or more preferences of the user based at least in part on the generated first profile. The method further includes one or more processors identifying one or more segments of textual data of forwarded media the user receives based at least in part on the one or more preferences of the user, wherein the textual data corresponds to a comments associated with the forwarded media.

DETAILED DESCRIPTION

Embodiments of the present invention allow for managing aggregated comments of a forwarded media content based on the sentiments associated with the content and relevance to a user. Embodiments of the present invention extract relevant comments from forwarded media content (e.g., attached video, image, article, etc.) based on a "selective profile" of a person commenting on the forwarded media content. Additional embodiments of the present invention manage distribution of comments and classify comments from the forwarded media content based on sentiments associated with the content and relevance to a user.

Some embodiments of the present invention recognize that challenges exist in personalized delivery of forwarded media content that includes only comments relevant to interests of a user. For example, forwarded content is a video of a famous musician performing and a journalist captured the video and posted the video on a website mentioning the date and venue where the musician performed. As the video later circulates through social media, several eminent music enthusiasts would have given a comment on the video. Additionally, a user can be more interested in comments from "profiled musicians" rather than a comment from a journalist or a normal audience, which creates a need for personalized way to classify comments of forwarded content through the delivery of only relevant comments. Various embodiments of the present invention provide an artificial intelligence and Internet of Things (IoT) based system and method to manage aggregated comments from forwarded content based on the sentiments associated with the content and relevance to the user.

Embodiments of the present invention can operate to increase efficiency of a computer system by reducing the amount of memory resources utilized by discarding irrelevant information. Additionally, various embodiments of the present invention improve the efficiency of network resources by reducing the amount of data the network has to transmit by discarding irrelevant textual data of media.

Implementation of embodiments of the invention may take a variety of forms, and exemplary implementation details are discussed subsequently with reference to the Figures.

Figure 1:
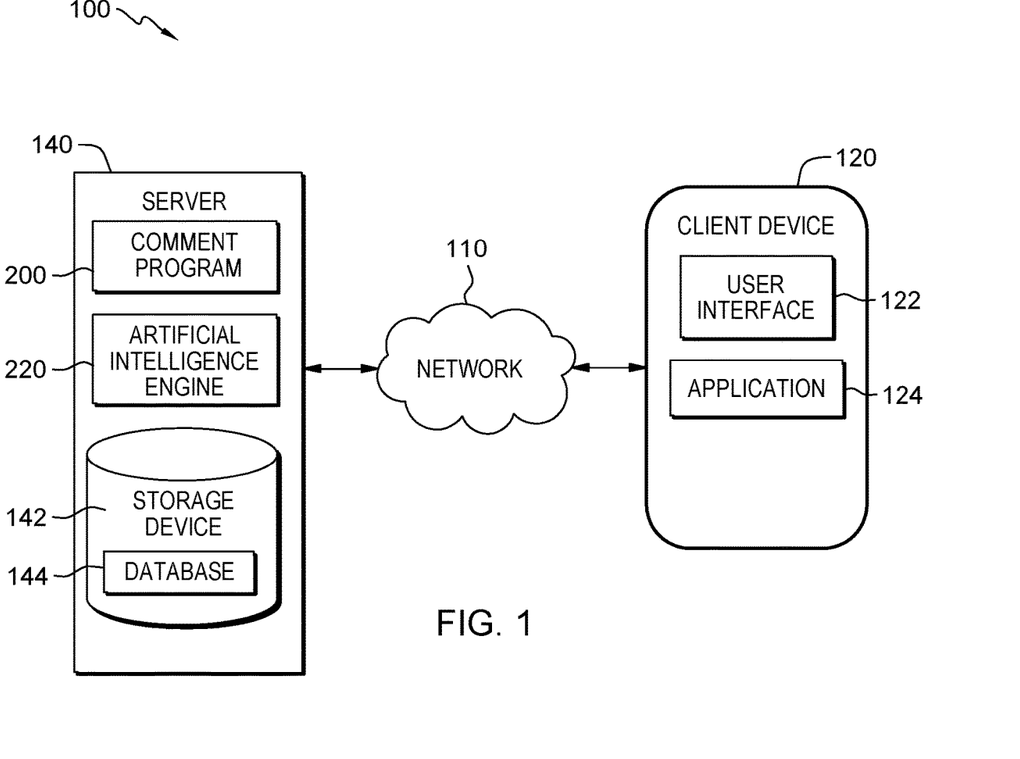
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Comment program 200 enables the authorized and secure processing of personal data. Comment program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Comment program 200 provides information regarding personal data and the nature (e.g., type, scope, purpose, duration, etc.) of the processing. Comment program 200 provides the user with copies of stored personal data. Comment program 200 allows the correction or completion of incorrect or incomplete personal data. Comment program 200 allows the immediate deletion of personal data.

Distributed data processing environment 100 includes server 140 and delivery device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 and delivery device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 4, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of comment program 200.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, artificial intelligence engine 220, and comment program 200. Storage device 142 can be implemented with any type of storage device, for example, persistent storage 405, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores numerous types of data which may include database 144. Database 144 may represent one or more organized collections of data stored and accessed from server 140. For example, database 144 includes textual data, audio data, visual data, posts, characteristic profiles, etc. In one embodiment, data processing environment 100 can include additional servers (not shown) that host additional information that accessible via network 110.

Comment program 200 can manage aggregated comments of a forwarded media content based on the sentiments associated with the content and relevance to a user. In one embodiment, comment program 200 generates a basic profile based on information provided by a user via client device 120. Additionally, comment program 200 utilizes the information of the basic profile to integrate with remote servers hosting web applications (e.g., social media platforms) to retrieve user activity data (e.g., likes, dislikes, shares, comments, etc.) and derive insights to enhance the profile of the user. Also, comment program 200 integrates with one or more IoT servers, which may reside in cloud-based network, to fetch additional user activity data (e.g., search history, view history, etc.) to further derive insights to enhance the profile of the user. Furthermore, comment program 200 can utilize artificial intelligence engine 220 to classify and identify each comment of aggregated comments of forwarded media content. Comment program 200 can then manage distribution of classified comments, based on the derived insights of the profile of the user.

Artificial intelligence engine 220 can identify and classify each comment of aggregated comments of forwarded media content to generate a specific profile associated with a source of each comment. In one embodiment, artificial intelligence engine 220 includes a convolutional neural network (CNN) model for correlating text and image (i.e., TI-CNN) that extracts information from audio, video, and/or textual data of forwarded media content. Additionally, artificial intelligence engine 220 may include a temporal duration corpus, personalization module, correlation module, and/or topic modeling module. Furthermore, artificial intelligence engine 220 is trained to correlate interest (e.g., derived insight) of a user that align with respective profiles of one or more commenters to extract information (e.g., comments of forwarded content media) relevant to a topic of a respective profile of a commenter.

Figure 2:
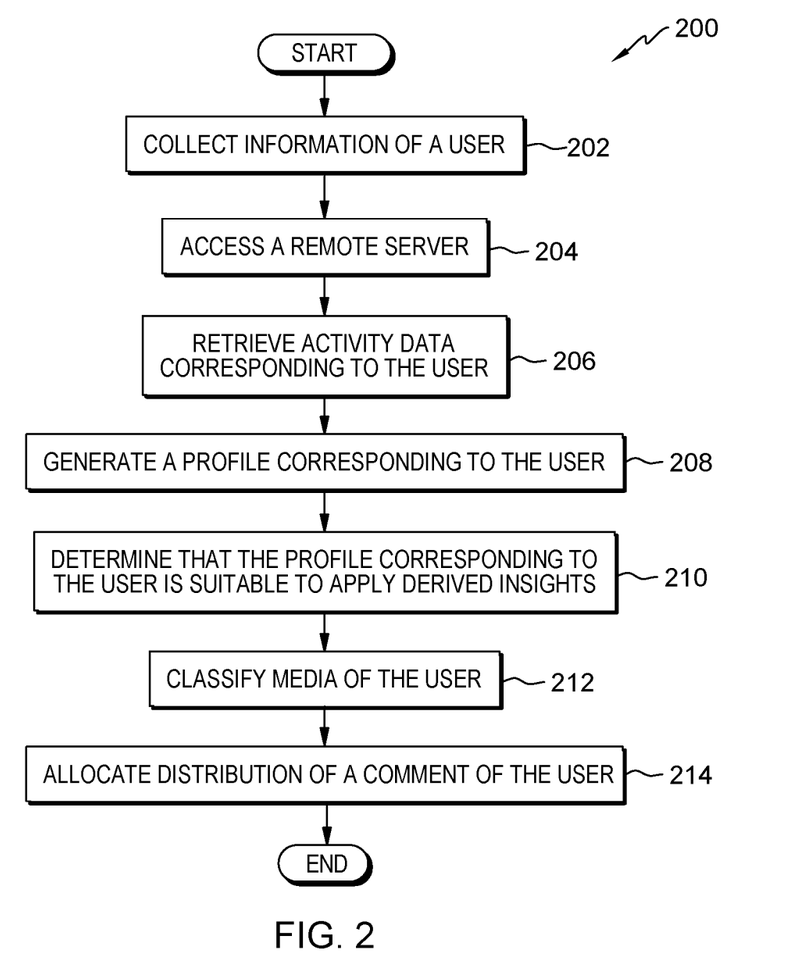
FIG. 2 is a flowchart depicting operational steps of a program, within the data processing environment of FIG. 1, for managing aggregated comments of a forwarded media content based on the sentiments associated with the content and relevance to a user, and blocking certain requests based on occurrence/threshold to prevent processing of the requests, in accordance with embodiments of the present invention.

FIG. 2 is a flowchart depicting operational steps of comment program 200, a program that manages aggregated comments of a forwarded media content based on the sentiments associated with the content and relevance to a user, in accordance with embodiments of the present invention. In one embodiment, comment program 200 initiates in response to a user connecting client device 120 to comment program 200 through network 110. For example, comment program 200 initiates in response to a user registering (e.g., opting-in) a laptop (e.g., client device 120) with comment program 200 via a WLAN (e.g., network 110). In another embodiment, comment program 200 is a background application that continuously monitors client device 120. For example, comment program 200 is a client-side application (e.g., application 124) that initiates upon booting of a laptop (e.g., client device 120) of a user and monitors data of the laptop.

In step 202, comment program 200 collects information of a user. In one embodiment, comment program 200 collects data of a user of client device 120. For example, a user attempts to register with comment program 200 and transmits user preferences (e.g., likes, dislikes, etc.) and/or access ID's of remote servers and/or web applications (e.g., IoT servers, social media, etc.) to comment program 200, which stores the information corresponding to basic profile of the user in a database (e.g., database 144). In this example, the user opts-in to comment program 200 allowing comment program 200 to access one or more associated IoT devices (e.g., client device 120) of the user and access one or more web applications (e.g., application 124) of the IoT devices.

In step 204, comment program 200 access a remote server. In one embodiment, comment program 200 utilizes information of database 144 to access a remote server. For example, comment program 200 uses a social media ID stored in a database (e.g. database 144) to integrate with a social media platform hosted on a remote server via a web application (e.g., application 124) of a laptop (e.g., client device 120) of the user. In this example, comment program 200 can utilize an HTTP-based API to programmatically query data of nodes, (e.g., a User, a Photo, a Page, a Comment, etc.), fields (e.g., data about an object), and/or edges (e.g., comments on media, connections between a collection of objects and a single object, etc.) of a knowledge graph of the social media site for information corresponding to the user. In another example, comment program 200 uses a user ID stored in a database (e.g. database 144) to integrate with one or more cloud based IoT server(s) to retrieve data from one or more devices (e.g., one or more instances of client device 120) corresponding to the user.

In step 206, comment program 200 retrieves activity data corresponding to the user. In one embodiment, comment program 200 fetches data of a remote server corresponding to a user of client device 120. For example, comment program 200 retrieves user activity data (e.g., likes, comments, shares, etc.) corresponding to a user ID (e.g., object, node, etc.) of the user. In another example, comment program 200 access one or more IoT server(s) and retrieves user activity data (e.g., search history, view history, etc.) from one or more IoT devices (e.g., smart televisions, mobile devices, laptops, etc.) of the user. In another example, comment program 200 utilizes data retrieved from social media platforms and/or IoT server(s) to generate a corpus corresponding to the user and stores the corpus in a database (e.g., database 144) of a server (e.g., server 140).

In step 208, comment program 200 generates a profile corresponding to the user. In one embodiment, comment program 200 utilizes textual data provided by a user and of a remote server corresponding to the user and generates a set of data corresponding to the user. For example, comment program 200 uses a machine learning algorithm to create a characteristic profile that corresponds to a user based on user activity collected data (as previously discussed in steps 202 and 206). Generally, comment program 200 may utilize multiple textual data entries corresponding to the user to generate a profile. In this example, comment program 200 uses an open-vocabulary approach to train the machine learning algorithm using scores from the collected and user activity data.

Additionally, the machine learning model includes five (5) personality characteristics (e.g., agreeableness, conscientiousness, extraversion, emotional range, openness, etc.) that represent user engagement, twelve (12) needs (e.g., excitement, harmony, curiosity, ideal, closeness, self-expression, liberty, love, practicality, stability, challenge, structure, etc.) that represent aspects of a product that resonate with the user, and five (5) values (e.g., self-transcendence, tradition, hedonism, self-enhancement, excitement, etc.) that represent motivating factors that influence user decision making. Furthermore, comment program 200 uses the machine learning model to generate scores that correspond to identified personality characteristics and values, where a score above the mean of 0.5 on a scale of zero (0) to one (1) indicates a greater than average tendency for a characteristic and a score at or above 0.75 indicates readily discernible aspects of the characteristic.

In another example, comment program 200 retrieves structured and unstructured textual data of forwarded media that corresponds to the user and tokenizes a comment of the textual data to develop a representation in an n-dimensional space. Additionally, comment program 200 uses an unsupervised learning algorithm for obtaining vector representations for words (e.g., words of comments) in the input text. In this example, comment program 200 feeds the input text into the machine learning algorithm that generates a normalized score of the input text (e.g., comment) by comparing the raw score with results from a sample population, which comment program 200 uses to infer a personality profile corresponding to the user that includes personality, needs, and values characteristics. Comment program 200 reports a percentile for personality, needs, and values characteristics as a double in the range of zero (0) to one (1) based on qualities inferred from the input text. Additionally, a percentile of 0.64980796071382 for the personality characteristic indicates that a posting account score for that characteristic is in the 65th percentile.

Additionally, the machine learning model can return scores for various consumption preferences. The machine learning model bases the preferences on the personality characteristics that it infers from the input text and results indicate a tendency of the user to prefer different products, services, and activities. The machine learning model reports consumption preferences that include a score for each preference (e.g., music, literature, activity, etc.). The machine learning model derives the score from the personality characteristics profile. The score is a double in the range of zero (0) to one (1) that indicates how likely the user corresponding to the characteristic profile is to prefer an item. For example, the user corresponding to the characteristic profile is either unlikely (0) or likely (1) to have an interest in the item (e.g., topic of a comment from a generated profile), which in some instances, can represent a simple yes or no response (e.g., relevance).

In decision step 210, comment program 200 determines that the profile corresponding to the user is suitable to apply derived insights. In various embodiments of the present invention, a meaningful characteristic profile can be created only where sufficient data of suitable quantity and quality is provided. Thus, up to a certain limit, more data is likely to improving of the machine learning algorithm by reducing the deviation between the predicted results and an actual score. In one embodiment, comment program 200 determines that retrieved data utilized to generate a set of data corresponding to a user is suitable. For example, comment program 200 determines that retrieved user activity data used to generate a characteristic profile that corresponds to a user is suitable. In this example, comment program 200 can determine whether the characteristic profile is suitable based on a strength score. In an alternative example, comment program 200 can determine whether the characteristic profile is suitable based on a threshold amount of data.

In one scenario, if comment program 200 determines the user activity data included at least three (3) likes and two (2) dislikes of the user to generate the characteristic profile, then comment program 200 can assign the characteristic profile a score of (0.6) on a scale of zero (0) to one (1), where characteristic profiles with score greater than (0.5) are suitable. In another scenario, comment program 200 uses six (6) months data from social media and three (3) months data from IoT server corresponding to the user to generate a characteristic profile, which amounts to 100 megabytes of user activity data, then comment program 200 compares the amount (e.g., 200 MB) of user activity data to a minimum data input threshold (e.g., 250 KB) and determines that the user activity data used to generate the characteristic profile is suitable. In scenarios where comment program 200 determines that the retrieved user activity data used to generate a characteristic profile is not suitable, comment program 200 continues to retrieve user activity data to improve the characteristic profile.

In step 212, comment program 200 classifies media of the user. In one embodiment, comment program 200 utilizes artificial intelligence engine 220 to classify textual data of forwarded media based on a generated set of data corresponding to a user. For example, comment program 200 compares personality, needs, and values characteristics of a generated characteristic profile of a user to a personality profile of a commenter (e.g., opted-in) to classify a comment included in a forwarded media (e.g., video, article, posts, etc.). In this example, comment program 200 utilizes an artificial intelligence engine to identify comments of the forwarded media that are relevant to the interests of the user.

In another example, comment program 200 inputs forwarded media content into an artificial intelligence (AI) engine that can identify a commenter as a person knowledgeable in music, sports, etc. based on user validation with the AI engine. Additionally, the AI engine identifies a person commenting in a group chat on various posts as a knowledgeable person in sports/music/literature and create a commenter profile corresponding to the person. As a result, the next time a comment from the commenter profile on a post is made, the AI engine identifies the person as knowledgeable in sports/music/literature. Embodiments of the present invention relevant to step 212 will be discussed in further detail with respect to artificial intelligence engine 220 and FIG. 3 below.

In step 214, comment program 200 allocates distribution of a comment of the media. In one embodiment, comment program 200 extracts one or more segments of textual data of forwarded media content identified by artificial intelligence engine 220 and transmits the one or more segments to client device 120. For example, an AI engine (e.g., artificial intelligence engine 220) determines that a classification (e.g., topic) of one or more comments (e.g., segments of textual data) of a social media post matches (e.g., aligns) a consumer preference of a characteristic (e.g., derived insight) profile of a user (as discussed with respect to FIG. 3). In this example, comment program 200 extracts the identified one or more comments of the social media post and generates a subset of comments relevant to one or more consumer preferences of the characteristic profile of the user. In an alternative example, comment program 200 discards one or more comments of the social media posts that are not aligned with the one or more consumer preferences of the characteristic profile of the user.

In one scenario, if comment program 200 determines that an output of the AI engine indicates that a comment does not originate from a generated profile that is knowledgeable on a topic or is not aligned to a consumer preference of the user, then comment program 200 disregards the comment (e.g., not display to a user). However, if comment program 200 determines that an output of the AI engine indicates that a comment does originate from a generated profile that is knowledgeable on the topic, then comment program 200 extracts the comment and adds the comment to a subset of comments relevant to a characteristic profile of the user. Additionally, comment program 200 modifies the social media post (e.g., forwarded media content) to include only the subset of comments relevant to the characteristic profile of the user.

Figure 3:
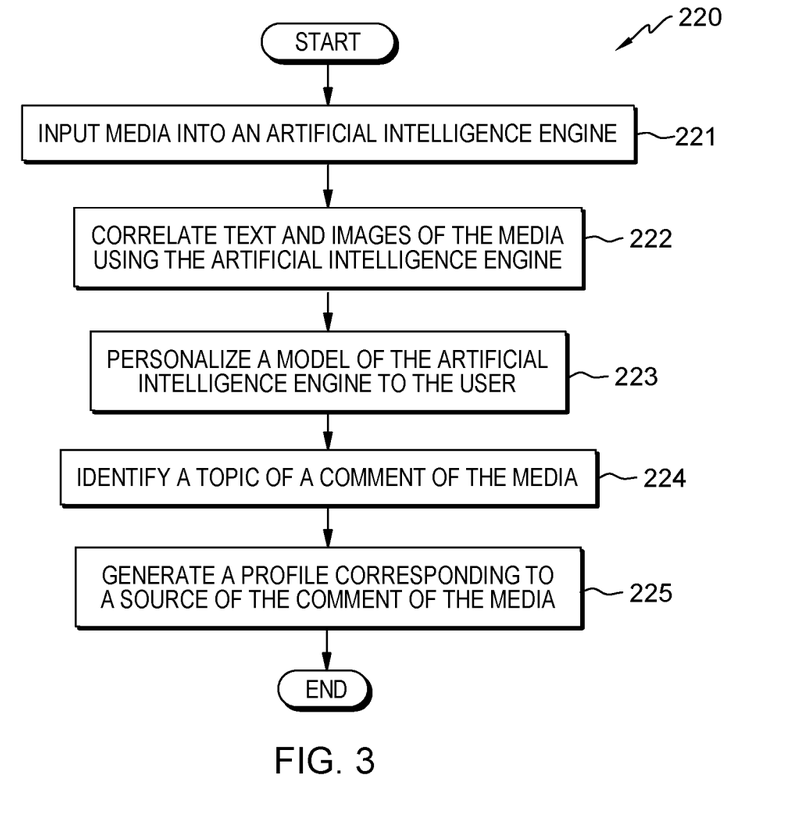
FIG. 3 is a flowchart depicting operational steps of a program, within the data processing environment of FIG. 1, for identifying each comment of aggregated comments of forwarded media content and classify each comment based on a set of data corresponding to a user, in accordance with embodiments of the present invention.

FIG. 3 is a flowchart depicting operational steps of artificial intelligence engine 220, a program that identifies each comment of aggregated comments of forwarded media content and classify each comment based on a set of data corresponding to a user, in accordance with embodiments of the present invention. In one embodiment, artificial intelligence engine 220 initiates in response to a user connecting client device 120 to comment program 200 through network 110. For example, artificial intelligence engine 220 initiates in response to a user registering (e.g., opting-in) a laptop (e.g., client device 120) with comment program 200 via a WLAN (e.g., network 110). In another embodiment, artificial intelligence engine 220 initiates in response to comment program 200 inputting forwarded media content into artificial intelligence engine 220. For example, comment program 200 inputs a video of a social media post (e.g., forwarded media content) a user is tagged in into artificial intelligence engine 220, which initiates upon receipt of the social media post.

In step 221, comment program 200 inputs media into an artificial intelligence engine. In one embodiment, comment program 200 inputs forwarded media content into artificial intelligence engine 220. For example, comment program 200 inputs video snippets and corresponding comments into an AI engine (e.g., artificial intelligence engine 220). In this example, the AI engine buffers the video snippets and corresponding comments into chunks of image frames (e.g., $\{f_1, \ldots, f_n\}$), which is stored over temporal duration 'D', to create a temporal duration corpus.

In step 222, comment program 200 correlates text and images of the media using the artificial intelligence engine. In one embodiment, comment program 200 utilizes artificial intelligence engine 220 to correlate text and images of forwarded media content of a user. For example, an AI engine (e.g., artificial intelligence engine 220) includes a Text Image-Convolutional Neural Network (TI-CNN) model that correlates text with images and extracts information from the audio, visual, and/or textual data of a video snippet and corresponding comments of a social media post. In this example, the AI engine can utilize supervised learning (e.g., support vector machines (SVMs)) to train a machine-learning model (e.g., neural network) to a comment of the corresponding comments, and/or a textual representation of audio data of the video snippet with one or more image frames of the video snippet. Additionally, the TI-CNN includes two parallel CNNs to extract latent features from both textual (e.g., comments, audio, etc.) and visual information (e.g., video, images, etc.) and then explicit and latent features are projected into the same feature space to form new representations of texts and images.

In step 223, comment program 200 personalizes a model of the artificial intelligence engine to the user. Generally, a recurrent neural network (RNN) is a class of ANN where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. Gated recurrent units (GRUs) are a gating mechanism in recurrent neural networks. GRU performance on polyphonic music modeling and speech signal modeling was found to be similar to that of LSTM. However, GRUs have been shown to exhibit better performance on smaller datasets.

In one embodiment, artificial intelligence engine 220 utilizes a long-short term memory model with a TI-CNN model to correlate text and images of forwarded media content with derived insight of a set of data corresponding to a user. For example, an AI engine includes an alternative layer of units (e.g., LSTM) with the TI-CNN model that uses interests of a characteristic profile of a user to predict relevant information (e.g., textual data of comments that are relevant to interests of a profile of the user) from text and images of forwarded media content. In this example, the AI engine utilizes LSTM units where each unit is composed of a cell, input gate, output gate, and forget gate and the cell remembers values over arbitrary time intervals and the gates regulate the flow of information into and out of the cell.

In step 224, comment program 200 identifies a topic of a comment of the media. In one embodiment, comment program 200 utilizes artificial intelligence engine 220 to determine a topic of textual data of forwarded media content. For example, comment program 200 uses a generative statistical model (e.g., latent Dirichlet allocation (LDA)) that classifies a comment to a particular topic and generates a topic per sentence model as well as a words per topic model, modeled as Dirichlet distributions. In this example, comment program 200 utilizes a bag-of-words (BOW) model to represent the words (e.g., textual data) of comments as a bag (e.g., multiset) of words of the comment along with occurrence (e.g., frequency of) of each word, which is used as a feature for training a classifier (e.g., LDA).

Additionally, the LDA model might have topics that can be classified as music related and sports related (e.g., consumer preferences). A topic has probabilities of generating various words, such as notes, chords, and concert, which can be classified and interpreted by the viewer as music related. Accordingly, the word music will have high probability given this topic. The sports related topic likewise has probabilities of generating each word: statistics, game, and championship might have high probability. A topic is identified on the basis of automatic detection of the likelihood of term co-occurrence. A lexical word may occur in several topics with a different probability, however, with a different typical set of neighboring words in each topic.

In step 225, comment program 200 generates a profile corresponding to source of the comment of the media. In various embodiments of the present invention comment program 200 trains an AI engine over multiple iterations, the AI engine may be modeled to correlate user interests of a characteristic profile of a user to align with generated profiles of commenters to determine whether a comment aligns with interests of the user. In one embodiment, comment program 200 utilizes artificial intelligence engine 220 to identify textual data of forwarded media content that is correlated with derived insight of a set of data corresponding to a user.

For example, comment program 200 inputs comment sections (e.g., aggregated textual data from various sources) of a video snippet post into the TI-CNN model of an AI engine that identifies one or more comments that are correlated to one or more interest of a characteristic profile corresponding (e.g., set of data corresponding to the user) to a user. In this example, comment program 200 extracts the information (e.g., source of comment, correlated interest, topic, etc.) and generates a profile corresponding to the source of the comment that indicates the user associates the source as knowledgeable in one or more user interests (e.g., topics, consumer preferences, etc.). Additionally, comment program 200 inputs profiles of commenters as attributes into the TI-CNN model to determine whether the comment includes a topic (e.g., sports, music, literature, etc.) that correlates with an interest of the characteristic profile that aligns with to the generated profile, which is indicated to be knowledgeable on the topic.

Figure 4:
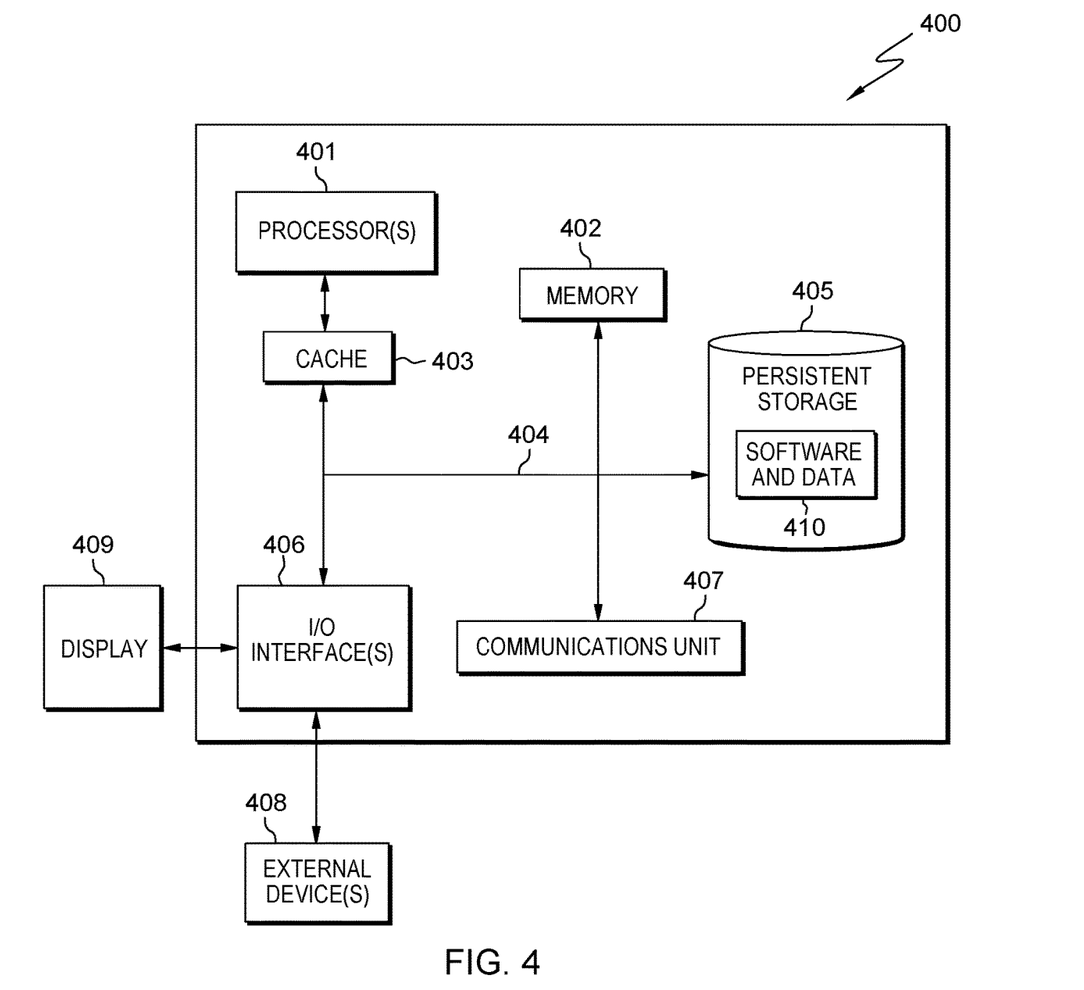
FIG. 4 is a block diagram of components of the client device and server of FIG. 1, in accordance with an embodiment of the present invention.

FIG. 4 depicts a block diagram of components of client device 120 and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124. With respect to server 140, software and data 410 includes data of storage device 142, artificial intelligence engine 220, and comment program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing aggregated textual data of forwarded media, the method comprising:
   identifying, by one or more processors, a user based at least in part on information provided by the user;
   accessing, by one or more processors, user activity data utilizing the information provided by the user;
   generating, by one or more processors, a first profile corresponding to the user based at least in part on the user activity data;
   determining, by one or more processors, one or more preferences of the user based at least in part on the generated first profile;
   identifying, by one or more processors, one or more segments of textual data of forwarded media the user receives based at least in part on the one or more preferences of the user, wherein the textual data corresponds to a comment associated with the forwarded media;

identifying, by one or more processors, a source corresponding to the one or more segments of the textual data, wherein the source indicates an origin of the one or more segments of the textual data; and delivering, by one or more processors, the one or more segments of textual data of forwarded media to the user.

2. The method of claim 1, further comprising:

extracting, by one or more processors, the one or more segments of the textual data of the forwarded media based at least in part on the one or more preferences of the user; and creating, by one or more processors, a subset of the textual data that includes the one or more segments of the textual data.

3. The method of claim 2, further comprising:

discarding, by one or processors, the textual data of the forwarded media the user receives; and modifying, by one or more processors, the forwarded media the user receives to include the subset of the textual data.

4. The method of claim 1, further comprising:

classifying, by one or more processors, a segment of the textual data of the forwarded media the user receives, wherein the segment is associated with a preference of the user; and identifying, by one or more processors, a first source corresponding to the segment of the textual data.

5. The method of claim 4, further comprising:

generating, by one or more processors, a second profile corresponding to the first source of the segment of textual data, wherein the generated second profile includes a user validation of the preference.

6. The method of claim 4, wherein identifying the one or more segments of the textual data of the forwarded media the user receives based at least in part on the one or more preferences of the user, further comprises:

determining, by one or more processors, a topic of the segment of the one or more segments of the textual data utilizing a machine learning model; and correlating, by one or more processors, the one or more preferences of the user with the segment of the one or more segments of the textual data, and the first source of the segment of the textual data utilizing the machine learning model.

7. The method of claim 1, wherein accessing the user activity data utilizing the information provided by the user, further comprises:

collecting, by one or more processors, a first set of user activity data corresponding to the user from one or more social media platforms; and collecting, by one or more processors, a second set of user activity data of a plurality of internet of things (IoT) devices of the user from one or more IoT servers.

8. A computer program product for handling incoming microservice requests at an application server, the computer program product comprising:

one or more computer readable storage media and program instructions stored on the one or more computer readable storage media, the program instructions comprising:

program instructions to identify a user based at least in part on information provided by the user;

program instructions to access user activity data utilizing the information provided by the user;

program instructions to generate a first profile corresponding to the user based at least in part on the user activity data;

program instructions to determine one or more preferences of the user based at least in part on the generated first profile;

program instructions to identify one or more segments of textual data of forwarded media the user receives based at least in part on the one or more preferences of the user, wherein the textual data corresponds to a comment associated with the forwarded media;

identify a source corresponding to the one or more segments of the textual data, wherein the source indicates an origin of the one or more segments of the textual data; and deliver the one or more segments of textual data of forwarded media to the user.

9. The computer program product of claim 8, further comprising program instructions, stored on the one or more computer readable storage media, to:

extract the one or more segments of the textual data of the forwarded media based at least in part on the one or more preferences of the user; and create a subset of the textual data that includes the one or more segments of the textual data.

10. The computer program product of claim 9, further comprising program instructions, stored on the one or more computer readable storage media, to:

discard the textual data of the forwarded media the user receives; and modify the forwarded media the user receives to include the subset of the textual data.

11. The computer program product of claim 8, further comprising program instructions, stored on the one or more computer readable storage media, to:

classify a segment of the textual data of the forwarded media the user receives, wherein the segment is associated with a preference of the user; and identify a first source corresponding to the segment of the textual data.

12. The computer program product of claim 11, further comprising program instructions, stored on the one or more computer readable storage media, to:

generate a second profile corresponding to the first source of the segment of textual data, wherein the generated second profile includes a user validation of the preference.

13. The computer program product of claim 11, wherein program instructions to identify the one or more segments of the textual data of the forwarded media the user receives based at least in part on the one or more preferences of the user, further comprise program instructions to:

determine a topic of the segment of the one or more segments of the textual data utilizing a machine learning model; and correlate the one or more preferences of the user with the segment of the one or more segments of the textual data, and the first source of the segment of the textual data utilizing the machine learning model.

14. The computer program product of claim 8, wherein program instructions access the user activity data utilizing the information provided by the user, further comprise program instructions to:

collect a first set of user activity data corresponding to the user from one or more social media platforms; and collect a second set of user activity data of a plurality of internet of things (IoT) devices of the user from one or more IoT servers.

15. A computer system for handling incoming microservice requests at an application server, the computer system comprising:
one or more computer processors;
one or more computer readable storage media; and
program instructions stored on the computer readable storage media for execution by at least one of the one or more processors, the program instructions comprising:
program instructions to identify a user based at least in part on information provided by the user;
program instructions to access user activity data utilizing the information provided by the user;
program instructions to generate a first profile corresponding to the user based at least in part on the user activity data;
program instructions to determine one or more preferences of the user based at least in part on the generated first profile;
program instructions to identify one or more segments of textual data of forwarded media the user receives based at least in part on the one or more preferences of the user, wherein the textual data corresponds to a comment associated with the forwarded media;
program instructions to identify a source corresponding to the one or more segments of the textual data, wherein the source indicates an origin of the one or more segments of the textual data; and
program instructions to deliver the one or more segments of textual data of forwarded media to the user.

16. The computer system of claim 15, further comprising program instructions, stored on the one or more computer readable storage media for execution by at least one of the one or more processors, to:
extract the one or more segments of the textual data of the forwarded media based at least in part on the one or more preferences of the user; and
create a subset of the textual data that includes the one or more segments of the textual data.

17. The computer system of claim 16, further comprising program instructions, stored on the one or more computer readable storage media for execution by at least one of the one or more processors, to:
discard the textual data of the forwarded media the user receives; and
modify the forwarded media the user receives to include the subset of the textual data.

18. The computer system of claim 15, further comprising program instructions, stored on the one or more computer readable storage media for execution by at least one of the one or more processors, to:
classify a segment of the textual data of the forwarded media the user receives, wherein the segment is associated with a preference of the user; and
identify a first source corresponding to the segment of the textual data.

19. The computer system of claim 18, further comprising program instructions, stored on the one or more computer readable storage media for execution by at least one of the one or more processors, to:
generate a second profile corresponding to the first source of the segment of textual data, wherein the generated second profile includes a user validation of the preference.

20. The computer system of claim 18, wherein program instructions to identify the one or more segments of the textual data of the forwarded media the user receives based at least in part on the one or more preferences of the user, further comprise program instructions to:
determine a topic of the segment of the one or more segments of the textual data utilizing a machine learning model; and
correlate the one or more preferences of the user with the segment of the one or more segments of the textual data, and the first source of the segment of the textual data utilizing the machine learning model.

* * * * *